United States Patent
Simonian et al.

(10) Patent No.: US 8,952,631 B2
(45) Date of Patent: Feb. 10, 2015

(54) METHOD OF OPTIMIZING LIGHT OUTPUT DURING LIGHT REPLICATION

(75) Inventors: Dmitri Simonian, Sunnyvale, CA (US); Steven Paolini, Saratoga, CA (US); Richard Jui-chi Koo, Belmont, CA (US)

(73) Assignee: Telelumen LLC, Saratoga, CA (US)

( * ) Notice: Subject to any disclaimer, the term of this patent is extended or adjusted under 35 U.S.C. 154(b) by 902 days.

(21) Appl. No.: 13/048,427

(22) Filed: Mar. 15, 2011

(65) Prior Publication Data

US 2012/0235600 A1  Sep. 20, 2012

(51) Int. Cl.
*H05B 37/02* (2006.01)
*H05B 33/08* (2006.01)

(52) U.S. Cl.
CPC .................................. *H05B 33/086* (2013.01)
USPC .......................................... 315/308; 315/291

(58) Field of Classification Search
CPC .. H05B 37/02; H05B 33/0842; H05B 33/086; H05B 33/0866; H05B 33/0875
USPC .......... 315/291, 293, 297, 307, 308, 312, 318
See application file for complete search history.

(56) References Cited

U.S. PATENT DOCUMENTS

| | | |
|---|---|---|
| 2005/0134197 A1* | 6/2005 | Lee et al. ...................... 315/291 |
| 2009/0323321 A1 | 12/2009 | Paolini |
| 2011/0137757 A1 | 6/2011 | Paolini et al. |
| 2011/0215725 A1 | 9/2011 | Paolini |
| 2012/0229048 A1 | 9/2012 | Archer |
| 2013/0268383 A1 | 10/2013 | Paolini |
| 2013/0307419 A1 | 11/2013 | Simonian et al. |

* cited by examiner

*Primary Examiner* — Jimmy Vu
(74) *Attorney, Agent, or Firm* — William F. Lang, IV; Lang Patent Law LLC

(57) ABSTRACT

A method of utilizing a light replication luminaire to match the spectral characteristics of light that is output from the luminaire to the spectral characteristics of a target light spectrum is provided. In one example, the method permits the user to assign a weight to one or more characteristics of the target light spectrum to be replicated. A best approximation of the target light spectrum is then determined, taking into account the weight assigned to each characteristic. In another example, the target light spectrum is provided to the luminaire by the user through the specification of various characteristics of the target light spectrum.

26 Claims, 7 Drawing Sheets

METHOD OF OPTIMIZING LIGHT OUTPUT DURING LIGHT REPLICATION

TECHNICAL FIELD

The present invention relates to the field of illumination. More specifically, a method of optimizing various characteristics of output light from a light replicating luminaire is provided.

BACKGROUND INFORMATION

What is generally known as "white" light is actually made from a combination of various wavelengths between about 350 nm and about 750 nm. Depending on the light source, different varieties of wavelengths, of different intensities, may be present. Although a casual observer might not notice the difference between "white" light from one source and "white" light from another source, the specific wavelengths present within the "white" light can have a significant impact on the usefulness of the light for a variety of applications.

Light from the sun is arguably the "gold standard" of illumination. Both the quantity of light provided by the sun, and the spectral distribution of light provided by the sun, vary throughout the day. This variation affects numerous biological processes, for example, the human weight-sleep cycle as well as plant and animal life cycles. Exposure to sunlight is known to have a positive effect on individuals who have been diagnosed with Seasonal Affective Disorder. Additionally, the specific wavelengths within the "white" light present affects the way colors are viewed, affecting not only the appearance of items such as clothing, but also the effectiveness with which tasks such as medical photography may be conducted.

The present inventors have good reason to believe that the ability to control the specific wavelengths present in "white" light has numerous benefits. Examples include sleep research and productivity research, as well as therapy for jet lag and Seasonal Affective Disorder. Agricultural benefits may include enhanced plant growth as well as improved yields during animal and fish farming. Photography, particularly for medical or cosmetic purposes, is often performed under complex, tightly controlled lighting conditions. Furthermore, the manner in which specific colors are presented has clear advertising and commercial benefits.

Many presently available light sources, such as incandescent bulbs, fluorescent tubes, and candles, have limited, fixed spectral characteristics. Although some dimming and spectral change is possible by controlling the power supply and/or utilizing filters, the amounts of change possible is limited, and particularly in the case of filters, results in decreased energy efficiency.

Accordingly, there is a need for a means to accurately reproduce the spectral characteristics of the sun as well as other desired light sources, for both static and dynamic lighting conditions. As one of many examples, such accurate reproduction of light could provide many of the benefits of direct sunlight within indoor environments. There is a further need to permit a user to accurately specify the spectral characteristics of the light to be output. Lastly, there is a need to permit the user to optimize various characteristics of the output light, as well as the specific manner in which the output light accurately mimics light from a target spectrum.

SUMMARY

The above needs are met by a light replicating luminaire, and in particular by a light replicating luminaire including a method of optimizing light output during replication. In one example, the method begins with providing a target light spectrum to the light replication luminaire, and assigning a weight to at least one characteristic of the target light spectrum to be matched. A best approximation of the target light spectrum is determined by utilizing the weight assigned to the characteristic or characteristics of the target light spectrum. With this information determined, driving conditions for each primary light sources present within the luminaire, for example, the amplitude modulation levels or pulse width modulation duty cycles for each of the primary light sources, may be determined.

In another example, the method begins by providing a user-selected target light spectrum to the light replication luminaire. A best approximation of the target light spectrum is determined, with the resulting approximation being in the form of a linear combination of the spectra of primary light sources available within the luminaire. This information is then used to set the driving conditions for each of the primary light sources within the luminaire.

These and other features of the invention will become more apparent through the following description and drawings.

BRIEF DESCRIPTION OF THE DRAWINGS

Like reference characters denote like elements throughout the drawings.

DETAILED DESCRIPTION

Figure 1:
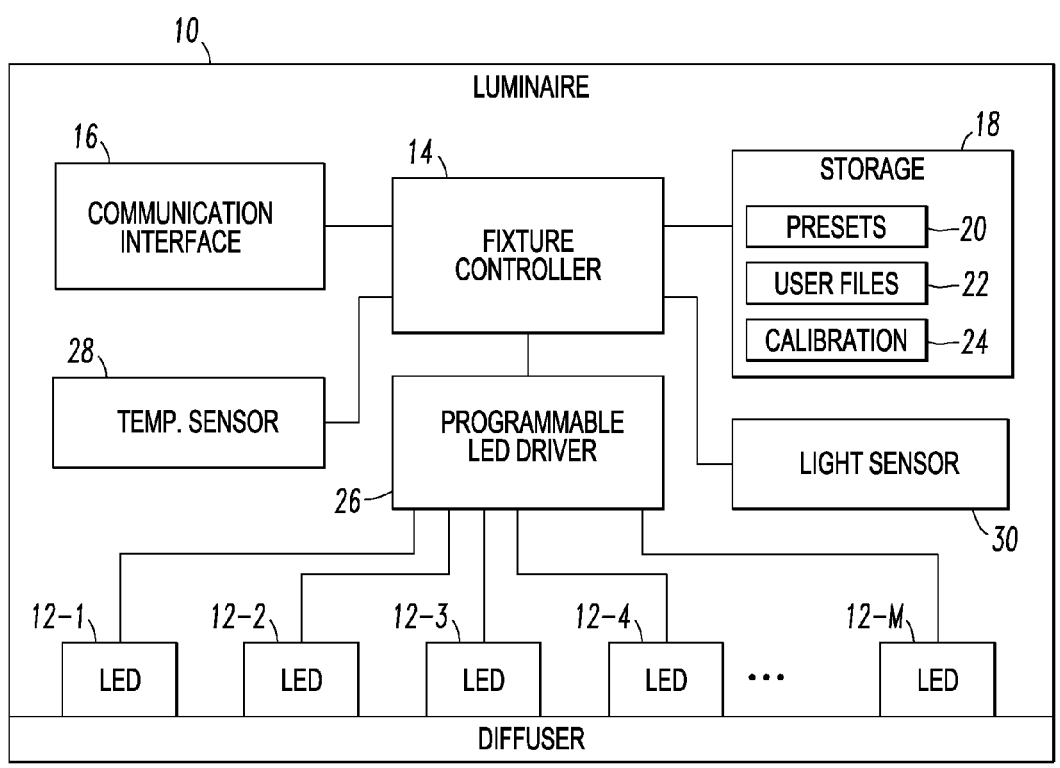
FIG. 1 is a schematic diagram of an example of a luminaire with which the present invention may be utilized.

Referring to the drawings, there is shown a method of optimizing the light output of a light replicating luminaire. An example of such a light replicating luminaire, invented by Steven Paolini, is disclosed in US 2009/0323321, which was published on Dec. 31, 2009, the disclosure of which is expressly incorporated by reference.

In order to best understand the method of optimizing the light output of the light replicating luminaire, some understanding of the light replicating luminaire itself is helpful. An example of such a luminaire 10 is illustrated in FIG. 1. The luminaire 10 of FIG. 1 includes a plurality of light sources 12-1 through 12-M, with some examples of the luminaire 10 having 16 light sources 12. Some examples of the 1 luminaire 10 will include light sources 12 which are light emitting diodes (LEDs). Each of the light sources 12-1 through 12-M is structured to produce a different wavelength of visible light, with the distribution of wavelengths explained in greater detail below. Alternatively, the luminaire may include wavelength channels, with each channel having multiple light sources, with each light source within a given channel emitting substantially the same wavelength. For the purposes of this description, light source, primary spectra, wavelength channel, and the like will be used interchangeably, and a wavelength channel as used herein may include a single light source or plurality of light sources. In either case, the light source or channel associated with a particular wavelength is individually controllable. Overall control of the luminaire 10 is accomplished by a fixture controller 14. A target light spectrum which the user wishes to reproduce may be communicated to the fixture controller 14 either through the communication interface 16 or the storage system 18. The communication interface 16 may be utilized to connect the luminaire 10 to an external control device. The storage system 18 may include factory preset target light spectrums in section 20, or user added target light spectrums in section 22. The storage system 18 may further include a section 24 containing calibration data, for example, the peak emitted wavelengths measured from the light sources 12-1 to 12-M, as well as other LED performance data.

The fixture controller 14 controls a programmable LED driver 26. The LED driver 26 individually controls the timing and intensity with which each of the LEDs 12-1 to 12-M (or each individual wavelength channel) are illuminated. The intensity of each of the light sources 12-1 to 12-M may be controlled either by controlling the amplitude of the drive current, and/or through pulse width modulation. During output of an approximation of the target light spectrum, the fixture controller 14 may utilize the temperature sensor 28 (or a plurality of temperature sensors which may in some examples measure the base temperature of each light source 12) and light sensor 30, in conjunction with the calibration data stored in storage section 24, to adjust the output of the light sources 12-1 to 12-M.

Figure 2:
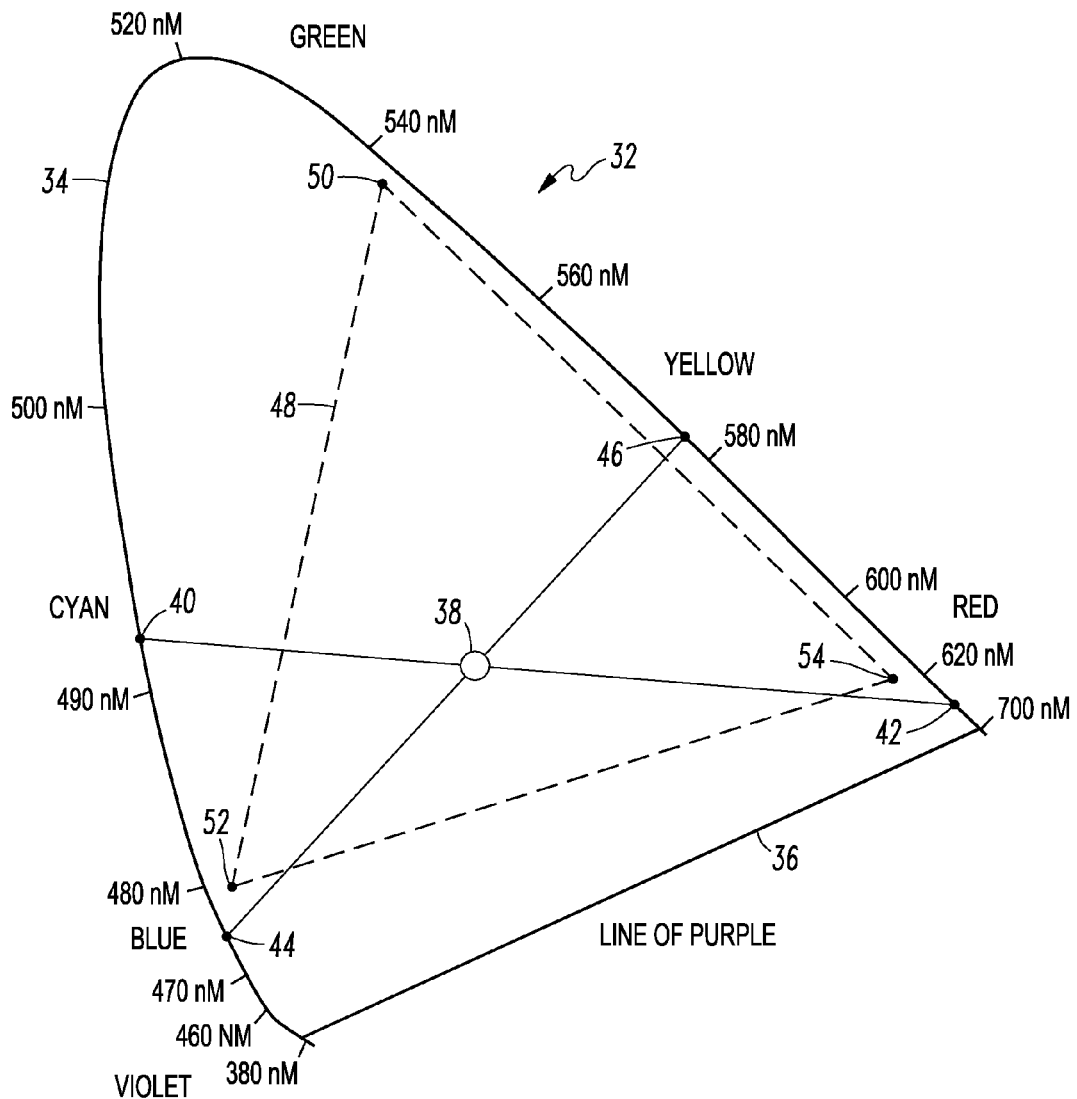
FIG. 2 is a chromaticity diagram illustrating the apparent color of light sources containing various combinations of emitters.
Figure 3:
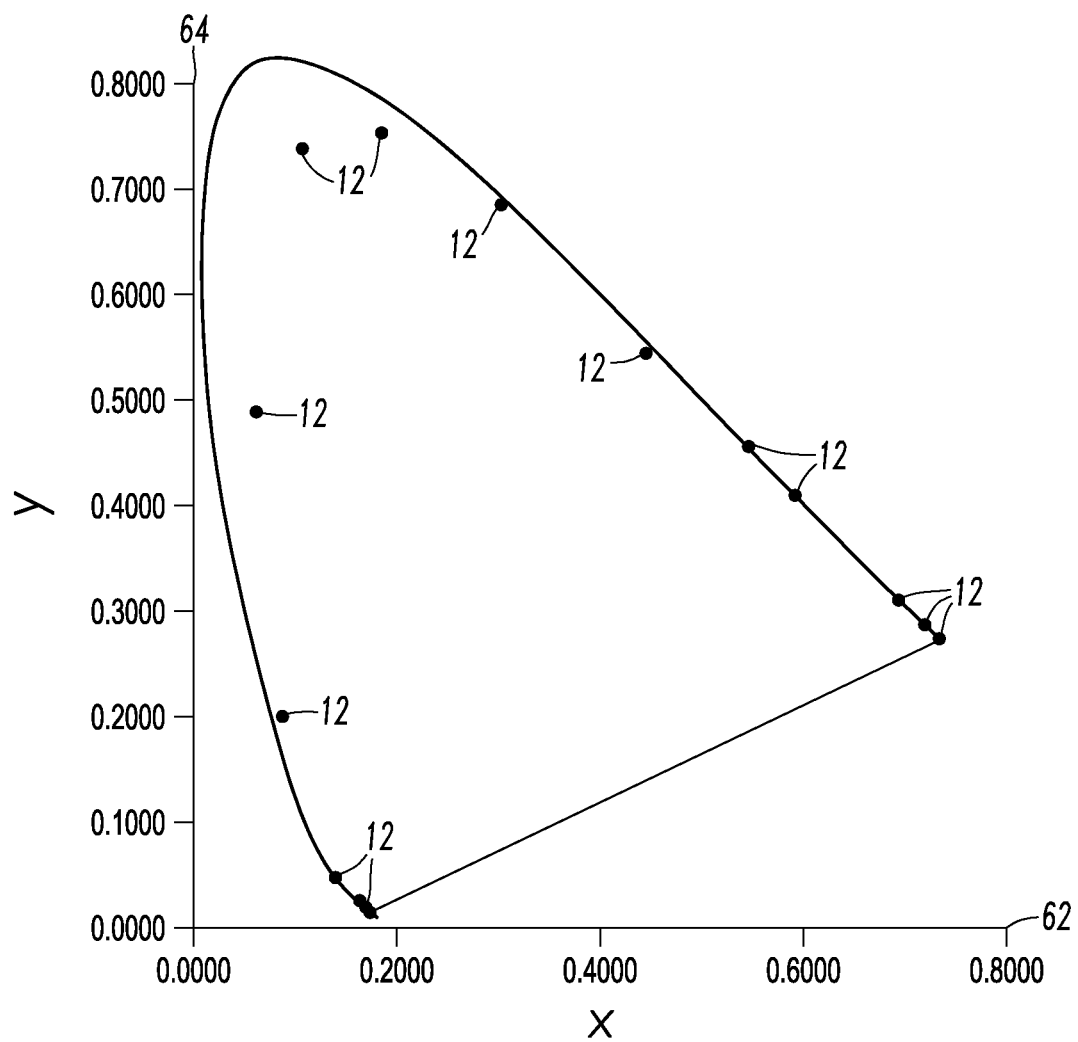
FIG. 3 is a chromaticity diagram illustrating an example selection of light sources for the luminaire of FIG. 1.

Referring to FIGS. 2-3, the selection of the light sources 12-1 to 12-M with respect to a standard chromaticity diagram is illustrated. The chromaticity diagram is intended to illustrate how combinations of wavelengths of visible light are perceived by the human eye. The photoreceptors within the human eye have sensitivity peaks to wavelengths of 422-440 nm, 530-540 nm, and 560-580 nm. Therefore, the manner in which a color appears to the human eye can be described by three parameters called tristimulus values, which are denoted X, Y, and Z, and which are derived parameters from the colors red, green, and blue, respectively. Additionally, the chromaticity diagram was specifically designed so that the Y parameter serves as a measure of the brightness of a color. Y can therefore be thought of as an axis that is perpendicular to the chromaticity diagram. The appearance of color within the diagram changes due to changing brightness as one moves along the Y axis. For example, the color white at one location along the Y axis will appear gray at a lower location along the Y axis.

Referring to FIG. 2, the portion 32 of the spectrum enclosed within the horseshoe shaped figure includes all of the chromaticities visible to the average person. The curved edge 34 of this region, corresponding to monochromatic light, is called the spectral locus. The lower part of this region, forming a straight line 36, is called the line of purples. Although colors along the line of purples are on the border of the visible region, they are not monochromatic light. The interior of the region includes combination of various wavelengths of light, with the central region 38 corresponding to white light. Within the visible spectrum 32, any colors falling along a line connecting two points can be produced by appropriate intensities of the wavelengths or combinations of wavelengths represented by those two points. For example, the white region 38 may be formed by an appropriate combination of cyan at point 40 and red at point 42. Alternatively, the white region 38 may be achieved by an appropriate combination of blue at point 44 and yellow at point 46. Similarly, all colors falling within the triangle 48 formed by points 50, 52, 54 may be produced by appropriate intensities of light of the wavelengths represented by points 50, 52, 54. Prior art devices are therefore known to use combinations of red, green, and blue LED's to produce the appearance of a wide range of colors. Given the greater number of wavelength channels available in many examples of a luminaire with which the present method is to be used, multiple combinations of wavelengths may be used to produce a desired perceived color, as well as a desired set of wavelength components forming the light.

Referring to FIG. 3, another example of a chromaticity diagram is illustrated. In the example of FIG. 3, a plurality of LEDs 12 are illustrated. Comparing FIG. 3 to FIG. 2, it can be seen that the larger number of LEDs 12 present in FIG. 3 surround a larger portion of the chromaticity diagram than the triangle formed by three LEDs in FIG. 2. More importantly, most of the color points within the chromaticity diagram can be reached through numerous combinations of illumination intensities of the LEDs 12. It is therefore possible not only to provide light having the appearance of a certain color, but also to provide light having a particular desirable combination of wavelength components. Accordingly, it is desirable to optimize the manner in which a selected target light spectrum is generated by taking into consideration the relative importance to the user of the various components of the target light spectrum that may be reproduced.

Figure 4:
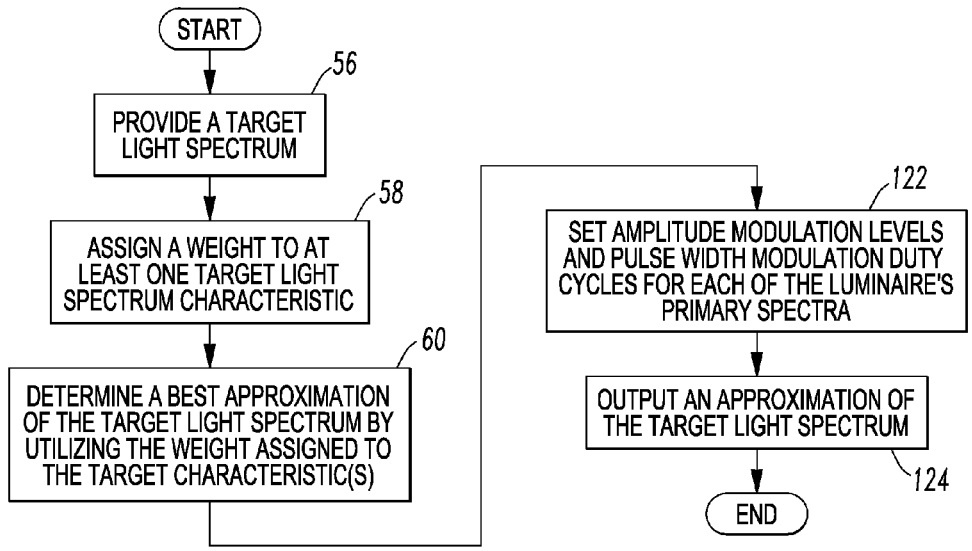
FIG. 4 is a flowchart showing the overall steps for generating an approximation of a target light spectrum based on user-assigned weights for the various target spectrum characteristics to be optimized.
Figure 5A:
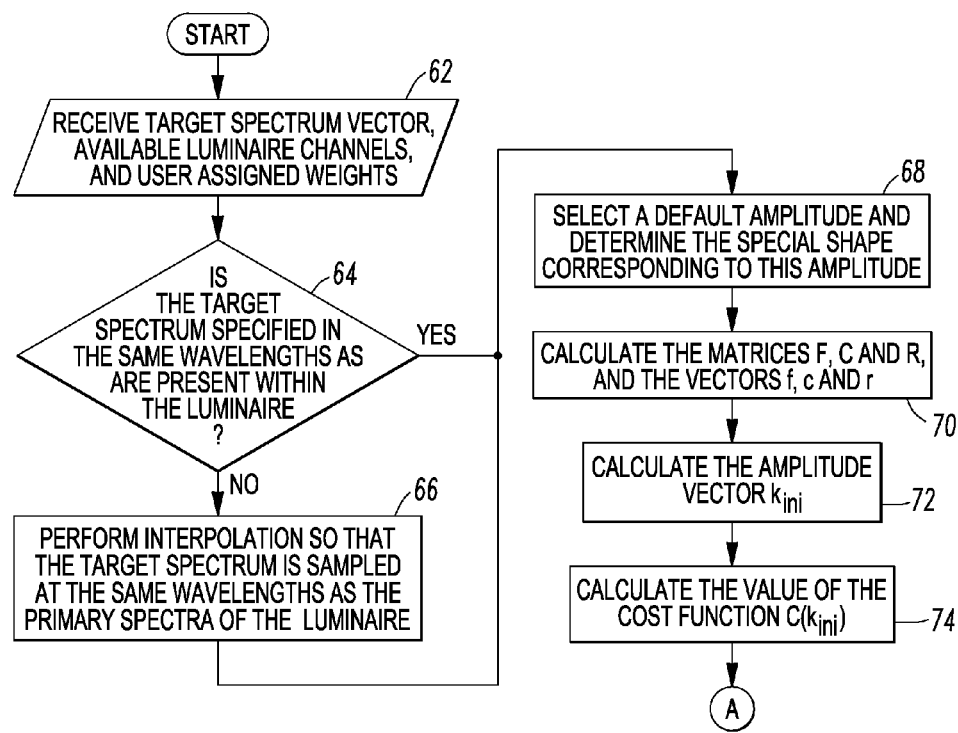
FIGS. 5A-5C depict a flowchart showing the specific steps for implementing step 60 in FIG. 4.
Figure 5B:
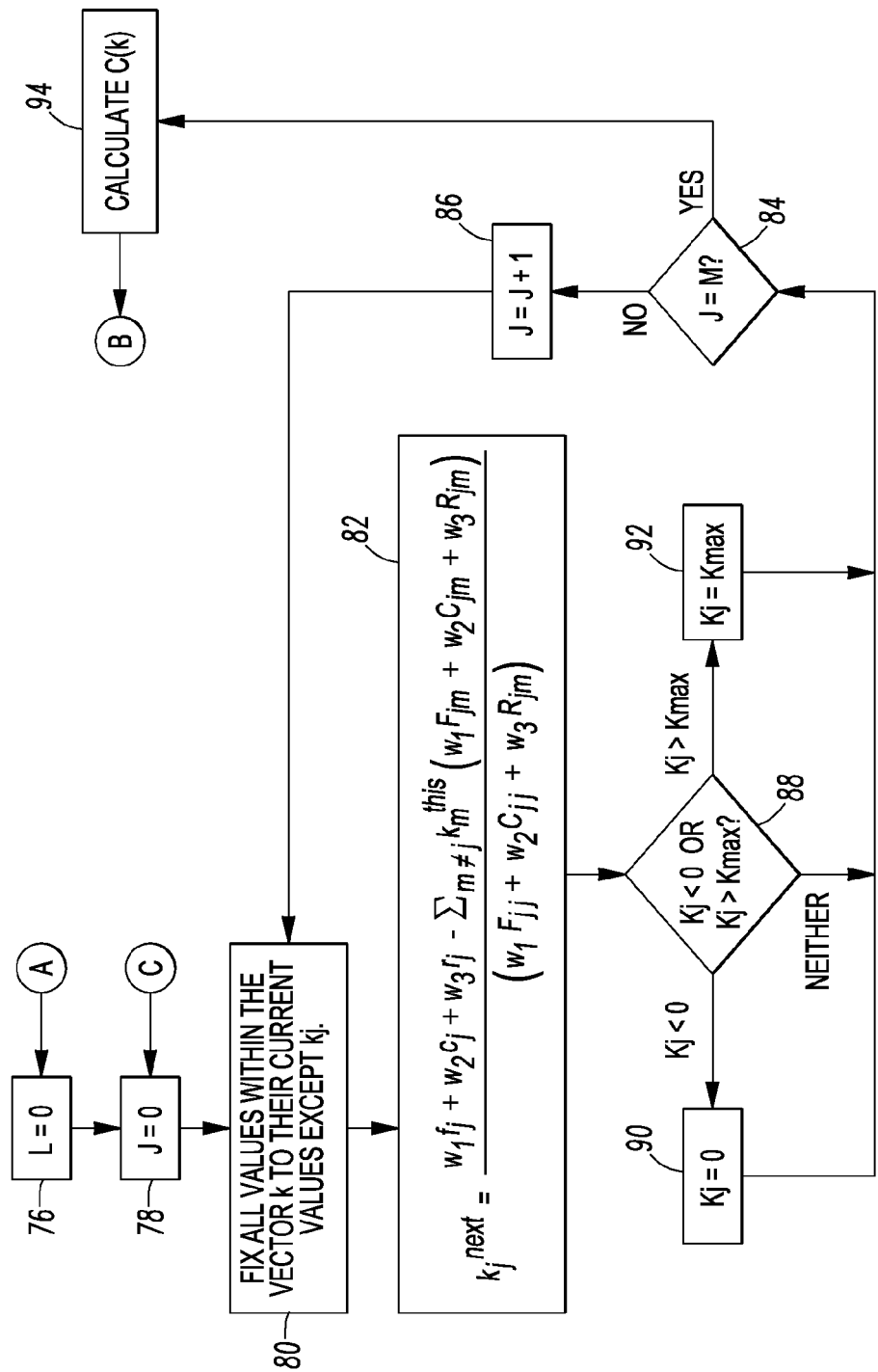
Figure 5C:
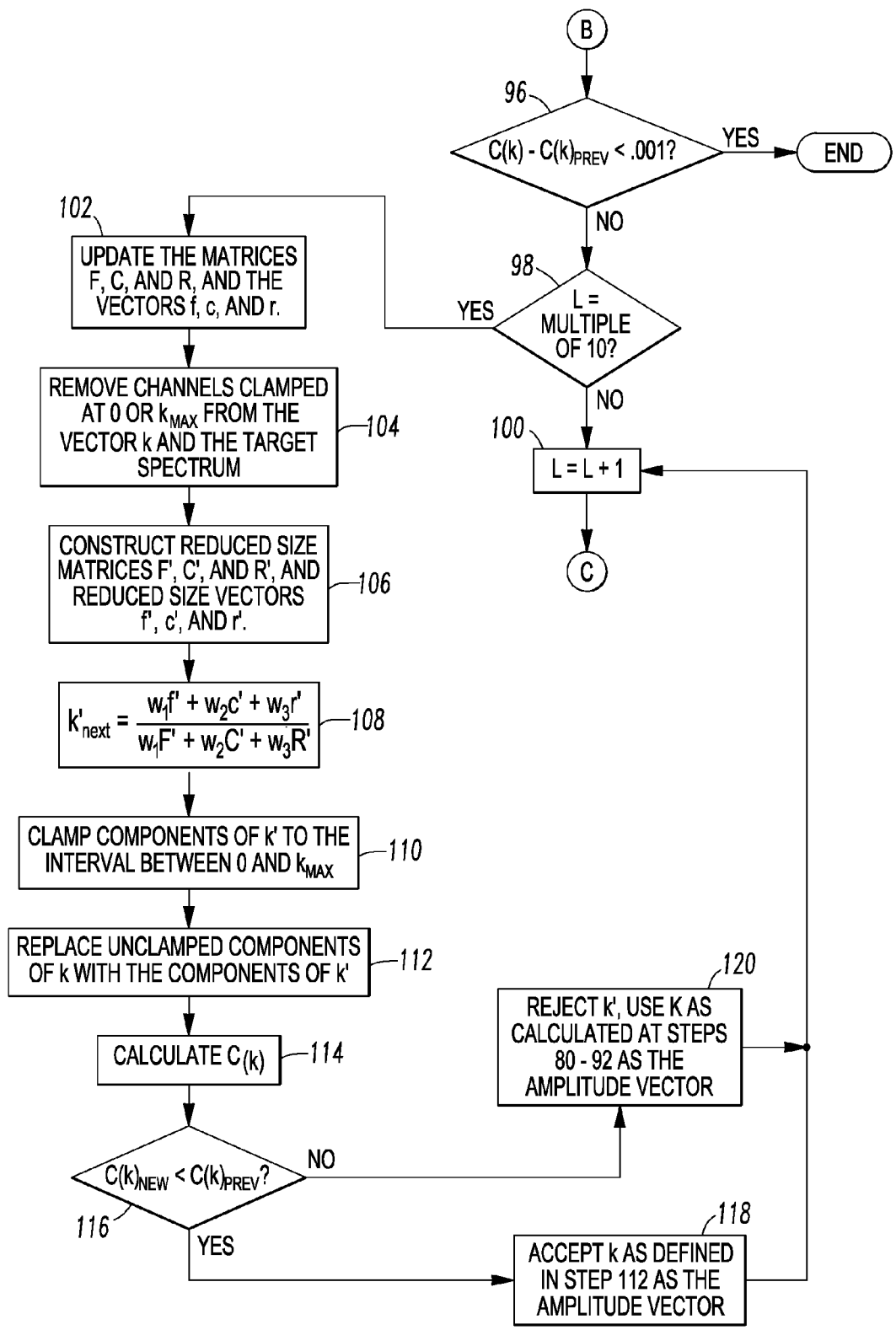

The general steps of optimizing an approximation of a target light spectrum are illustrated in FIG. 4. Initially, the target light spectrum is provided at step 56. The target light spectrum may be one which has been previously recorded. The target light may be specified directly by providing its intensity spectrum. This method is preferred when maximum accuracy is desired. Alternatively, the target light spectrum may be specified as a vector of coefficients, with each coefficient corresponding to one of the primary light sources present within the luminaire or within another reference luminaire. This method is desired when the compactness of representation of the target light spectrum is important.

The user may specify the weight to assign to one or more characteristics of the target light spectrum to be reproduced at step 58. Examples of characteristics that may be optimized include the target spectral shape, the color point, the luminous flux, color rendering quality measured by CRI or CQS (color quality scale) and/or the energy efficiency of the luminaire. Energy efficiency can be maximized by minimizing the number of channels driven within the luminaire, and/or by utilizing the channels having the most efficient emitters. Some applications may require that the target spectral shape be reproduced with the highest level of accuracy, without regard to color point or luminous flux. Other applications may place a higher priority on color point and/or luminous flux. Each characteristic that may be optimized is assigned a weight by the user. Alternatively, the weights may be pre-programmed into the luminaire. These weights are taken into account by the optimization algorithm which is described below.

The best approximation of the target light spectrum is determined at step 60 in FIG. 4. This approximation takes into account the weight assigned to the accuracy with which each of the characteristics of the target light spectrum is to be approximated. The most typical objective is to approximate the shape of the target spectrum or, expressed differently, to provide the various wavelengths of light present in the approximation in the same proportion as they exist in the target light spectrum. This is best measured by minimizing the mean square error of the approximation. Mathematically, the function to be minimized is expressed below.

$$C_1(k) = \|S_a - S_t\|^2 = \sum_{n=0}^{N-1}\left[\sum_{m=0}^{M-1} k_m s_m^n - S_t^n\right]^2$$

Where:

$C_1(k)$=mean square of error $S_a$=best approximation of the target spectrum $S_t$=target illumination spectra N=number of wavelengths at which spectra are sampled, which in some examples will be 401

M=number of controllable light channels, which in some examples=16

$S_m$=spectral shape; the spectrum of a source channel is equal to $k_m \times S_m$ k=driving amplitude Minimizing the difference between the color points of the target light spectra and the approximation may also be desired. This criterion is best understood with reference to the chromaticity diagram of FIGS. 2-3. The chromaticity diagram of FIG. 3 includes a grid with an x axis 62 and a y axis 64. A specific color point within the chromaticity diagram 16 may be specified by its location coordinates x and y, along with its brightness or intensity coordinate Y. With this information known, the tristimulus values X, Y, and Z values may be calculated. The tristimulus values are defined in terms of the spectral power distribution $I(\lambda)$, where $\lambda$. Is the wavelength, and the color matching functions $x(\lambda)$, $y(\lambda)$, and $z(\lambda)$, so that:

$X=\int_0^\infty I(\lambda)x(\lambda)d(\lambda)$ $Y=\int_0^\infty I(\lambda)y(\lambda)d(\lambda)$ $Z=\int_0^\infty I(\lambda)z(\lambda)d(\lambda)$ If a user is defining the target light spectrum in terms of x, y, Y, then the tristimulus values X and Z are calculated based on the color point values as follows:

$$X = \frac{Y}{y}x$$

$$Z = \frac{Y}{y}(1-x-y)$$

Other methods may be utilized to specify the target light spectrum, depending on the color space selected.

With the tristimulus values calculated, minimizing the difference $C_2(k)$ between the color points of the target spectrum and the color points of the approximation can be accomplished by minimizing the following expression.

$C_2(k)=(X_a-X_t)^2+(Y_a-Y_t)^2+(Z_a-Z_t)^2$

As another alternative, it may be desirable to minimize the difference in the radiant fluxes $C_3(k)$ between the target spectrum $P_t$ and the approximation $P_a$. The function to be minimized is therefore:

$$C_3(k) = (P_a - P_t)^2 = \left[\sum_{N=0}^{N-1}\left(\sum_{m=0}^{M-1} k_m s_m^n - S_t^n\right)\right]^2$$

Therefore, when the spectrum of the approximation is determined by taking into account the weights $\omega_1$, $\omega_2$, and $\omega_3$ for the importance of matching the spectral shape, color points, and luminous flux, respectively, the function C(k) to be minimized is therefore:

$C(k)=\omega_1 C_1(k)+\omega_2 C_2(k)+\omega_3 C_3(k)$

From this function, it becomes obvious that assigning a higher weight to a given criterion increases the effect of that criterion on the approximation spectrum. In some examples, the weights $\omega_1$, $\omega_2$, and $\omega_3$ may be assigned any value between a minimum of "0" (no effect whatsoever on the approximation spectrum) and a maximum of "1" (maximum effect on the approximation spectrum). Cost functions may be normalized during the minimization process; for example, $C_1(k)$ may be divided by $\|S_t\|$ before calculations begin. Similarly, $C_2(k)$ may be divided by $P_t^2$.

Having specified the cost function C(k), we now look for values of k (amplitude) which result in minimum values of C(k). Values of k are constrained between zero and the maximum amplitude with which a given wavelength channel may be driven. Various constrained minimization methods are known in the prior art, for example, gradient descent or other iterative minimization procedures. One example of a minimization method utilizing coordinate-wise descent follows.

To minimize C(k), we look for an extremum of C(k) by taking its partial derivative and determining at which values of k this function equals zero. If we expand C(k) to include the components of $C_1(k)$, $C_2(k)$, and $C_3(k)$ from above, we have:

$C(k)=\omega_1\|S_a-S_t\|^2+\omega_2[(X_a-X_t)^2+(Y_a-Y_t)^2+(Z_a-Z_t)^2]+\omega_3(P_a-P_t)^2$ Next, we take the partial derivative of C(k):

$$\frac{\partial C(k)}{\partial k} = w_1\frac{\partial C_1(k)}{\partial k} + w_2\frac{\partial C_2(k)}{\partial k} + w_3\frac{\partial C_3(k)}{\partial k}$$

Looking at each of the three components of C(k) individually, the partial derivatives of $C_1(k)$, $C_2(k)$, and $C_3(k)$ are as follows.

$$\frac{1}{2}\frac{\partial C_1(k)}{\partial k_j} = \sum_{n=0}^{N-1} s_j^n\left(\sum_{m=0}^{M-1} k_m s_m^n - S_t^n\right) = \sum_{m=0}^{M-1} k_m s_j s_m - s_j S_t$$

$$\frac{1}{2}\frac{\partial C_2(k)}{\partial k_j} = X_j\left(\sum_{m=0}^{M-1} k_m X_m - X_t\right) + Y_j\left(\sum_{m=0}^{M-1} k_m Y - Y_t\right) + Z_j\left(\sum_{m=0}^{M-1} k_m Z_m - Z_t\right)$$

$$\frac{1}{2}\frac{\partial C_3(k)}{\partial k_j} = P_j\left(\sum_{m=0}^{M-1} k_m P_m - P_t\right)$$

For compactness of the expressions below, the matrices F, C, and R, of size M×M, will be introduced, along with vectors f, c, and r, of size M×1. Each element within the matrices and vectors is calculated as follows:

$f_j=s_j S_t$ $F_{jm}=s_j s_m$ $$c_j = X_j X_t + Y_j Y_t + Z_j Z_t$$

$$C_{jm} = X_j X_m + Y_j Y_m + Z_j Z_m$$

$$r_j = P_j P_t$$

$$R_{jm} = P_j P_m$$

Making appropriate substitutions, the expression we will utilize to look for extrema of C(k) is:

$$\sum_{m=0}^{M-1} k_m(w_1 F_{jm} + w_2 C_{jm} + w_3 R_{jm}) = w_1 f_j + w_2 c_j + w_3 r_j$$

Expressed in matrix form:

$$k(\omega_1 F + \omega_2 C + \omega_3 R) = \omega_1 f + \omega_2 c + \omega_3 r$$

To solve this equation, a procedure known as coordinate wise descent will be utilized. This procedure will be described with reference to FIGS. 5A-5D. The target spectrum, available wavelengths for the LED's within the luminaire 10, and user-assigned weights are received at step 62. Ideally, the target spectrum should be specified for wavelengths at which the primary spectra of the luminaire are sampled. This is checked at step 64. If the target spectrum is not specified in this manner, interpolation is performed so that the target spectrum is sampled at the same wavelengths as the primary spectra of the luminaire at step 66.

The coordinate-wise descent process begins with an initial guess of the spectral shape of the closest approximation of the target spectrum given a preselected value of k, at step 68. For example, the value of k may be selected to be about one half the total amplitude available within each wavelength channel within the luminaire. In the example of a luminaire with a maximum amplitude of 64 for each channel, an example starting point would be a value of k equal to about 32. Given this initial guess, the matrices F, C, and R, as well as the vectors f, c, and r, are recalculated at step 70, because the spectral shape of the light sources is dependent on the amplitude k. Following this calculation, the initial value of the amplitude vector k is calculated at step 72 as follows.

$$k_{ini} = (\omega_1 f + \omega_2 c + \omega_3 r) \cdot (\omega_1 F + \omega_2 C + \omega_3 R)^{-1}$$

To evaluate the progress of the coordinate-wise descent, an initial value of the cost function C(k) is calculated at step 74. To control the following process, the number of iterations L and the specific element j of the amplitude vector k being evaluated are initialized at steps 76 and 78, respectively.

Next, fix all values of the vector k to their initial value, but treat $k_0$ as a variable (step 80), and solve the following equation to determine the new value of $k_0$ at step 82.

$$k_j^{next} = \frac{w_1 f_j + w_2 c_j + w_3 r_j - \sum_{m \neq j} k_m^{this}(w_1 F_{jm} + w_2 C_{jm} + w_3 R_{jm})}{(w_1 F_{jj} + w_2 C_{jj} + w_3 R_{jm})}$$

Once this is completed, $k_0$ is fixed at its newly determined value, and the process is repeated, treating $k_1$ as a variable, and solving for $k_1$ (steps 84 and 86). This process is repeated for each value of $k_j$, through $k_{M-1}$. For the purpose of this description, the process of sequentially solving for all values within the vector k, from $k_0$ to $k_{M-1}$, is considered to be one iteration.

It is possible that a mathematical solution to this equation will result in values within the vector of k which either exceed the maximum amplitude for each channel within the luminaire, or which are negative. As a practical matter, solutions capable of being implemented on the luminaire are constrained between zero and the maximum amplitude per channel ($k_{max}$). Therefore, any values of k that fall outside of this range are constrained to either zero or $k_{max}$ (steps 88, 90, and 92). If the value of any element $k_j$ is clamped at zero or $k_{max}$, and this value does not change in subsequent iterations, it may be possible to assign the clamped value of zero or $k_{max}$ to that element $k_j$ for all subsequent iterations, ignoring the clamped elements $k_j$ in subsequent calculations.

Once an iteration is completed, the value of the function C(k) is calculated at step 94. Recall that a minimized value of C(k) indicates maximized accuracy with which the approximation duplicates the target spectrum. The current value of C(k) is compared to the previous value to determine the extent to which the iteration improved the correlation between the target spectrum and the approximation at step 96.

Given unlimited computational time, it would be preferable to update the matrices F, C, and R after each iteration. However, accurately reproducing a dynamic lighting event, with the target spectrum changing over time, makes a faster computational time preferable. Therefore, the matrices F, C, and R are updated after a predetermined number of iterations, with one example being to update the matrices F, C, and R after about 10 iterations. This is illustrated at steps 98, 100, and 102 in the flowchart.

At another predetermined number of iterations, which may in some examples be the same number of iterations as the number between each update of the matrices F, C, and R, an attempt is made to speed up the calculation by assuming that those coefficients which at the current iteration are found at the boundary (either zero or $k_{max}$) will stay at the boundary in subsequent iterations, and no additional components will move to the boundary at subsequent iterations. With this assumption made, the contributions of those values of $k_j$ which have been clamped at zero or $k_{max}$ are removed from the target spectrum at step 104, resulting in a smaller amplitude vector k'. Next, matrices F', C', and R', as well as vectors f', c', and r' are constructed from the remaining values of k at step 106. Using these smaller matrices, the next values of $k'_j$ are calculated by solving the unconstrained matrix equation shown below at step 108.

$$k'_{next} = (\omega_1 f' + \omega_2 c' + \omega_3 r') \cdot (\omega_1 F' + \omega_2 C' + \omega_3 R')^{-1}$$

We refer to this process as "subspace minimization."

As before, $k'_{next}$ must only include values between zero and $k_{max}$ in order to be meaningful, so $k'_{next}$ is clamped to this range at step 110. The variable components of k are replaced by the components of k' at step 112, and the value of C(k) is calculated at step 114. If the new value of C(k) is lower than the previous value at step 116, then the vector k with its variable components replaced by the components of k' is accepted as the next amplitude vector at step 118. Otherwise, the values of k' are rejected at step 120. In either case, we continue to try to minimize C(k), either by continuing iterative minimization, or by finding a next k' using subspace minimization a plurality of times.

Coordinate wise descent continues until a predetermined criterion for stopping the procedure is reached. This criterion may be a value of C(k) below a predetermined maximum acceptable C(k). Alternatively, the predetermined level of accuracy may be defined in terms of an absolute or relative $(C(k)_{prev} - C(k) > C(k)_{prev} \times 0.001)$ difference between the current value of C(k) in the previous value of C(k) falling below a predetermined value, indicating that diminished improvements in accuracy will be achieved by future iterations. This is the example shown in step 96. In some examples, a change in the value of C(k) below a specified value, for example, of about 0.001 or less, may be specified to indicate that subsequent iterations will not result in significantly greater accuracy. Some examples may place a limit on the number of iterations to be performed, with an example limit being 2000 iterations, and with a level of accuracy achievable with this number of iterations being acceptable. As another alternative, a relative change in the value of the calculated amplitudes k below a certain level may indicate that further iterations will not significantly improve accuracy. As another example, a specific value of an individual cost function component, such as $C_2(k)$, may be taken as a stopping criterion.

Referring back to FIG. 4, once the final value of the amplitude vector k has been calculated, the driving conditions for each wavelength is determined at step 122. These driving conditions may in some examples be specified as amplitude modulation levels and/or pulse width modulation duty cycles for each of the luminaire's primary light sources. Although it is possible to utilize either solely amplitude modulation or solely pulse width modulation to control the individual light sources 12 (or a wavelength channel consisting of multiple light sources of the same wavelength), the most precise, efficient control of the light sources 12 can be achieved through a combination of amplitude modulation and pulse width modulation. In general, because LED efficiency drops with increasing drive current, it is preferable when using LED's as light sources to use the lowest possible amplitude level, and highest possible duty cycle, to drive each wavelength channel. The amplitude level for each wavelength channel may therefore be set at the lowest possible value exceeding the value of the amplitude vector component $k_j$ for that wavelength channel. The intensity of that wavelength channel may then be reduced to the appropriate level by reducing the pulse width modulation duty cycle below 100%, to a level that will produce the appropriate intensity. Furthermore, in one example of a luminaire 10, amplitude is encoded in six bits, while the pulse width modulation duty cycle is encoded in 16 bits. Therefore, amplitude modulation may be utilized to provide course intensity adjustment, while pulse width modulation may be utilized to fine tune the intensity of a given wavelength channel. With the amplitude modulation levels and pulse width modulation duty cycles set, the approximation of the target light spectrum is output at step 124.

In some instances, the target light spectrum may be one that was previously recorded and encoded for playback. In other instances, it is possible for a user to specify the target light spectrum. In some examples, the target light is specified by the color point on a chromaticity diagram corresponding to the desired color (which in many instances will be a variation of white light). The color point is specified by its chromaticity coordinates x and y, as well as its intensity Y. Alternatively, the color point may be specified as a correlated color temperature and the distance from a black body curve in a 2-dimensional representation of the color space. As another alternative, a color point in a 3-dimensional color space may be specified. Although a color point specified in this manner is sufficient to specify the location of the target light spectrum within the chromaticity diagram, many different combinations of wavelengths can be used to achieve the selected color point. The specific combination of wavelengths present may be as determinative of whether the user's purpose is achieved as the appearance of the overall color. To maximize the likelihood of achieving the user's purpose while also simplifying the process of inputting the desired target light spectrum, some simplifying assumptions may be made. For many applications, natural sunlight, which contains a mixture of a wide variety of wavelengths, may be regarded as the "gold standard" for light. Therefore, in many applications, including as many wavelengths as possible may be desired.

If a user selects a color point relatively close to a central region of the chromaticity diagram 32, it may safely be assumed that the user would like the approximation of the target light spectrum to include as many wavelengths of light as possible. In some applications, it may be assumed that if a target color point is relatively close to a central region of the chromaticity diagram 32, color rendering quality of the target light measured by, for example, CRI or CQS, should be maximized. Conversely, if the user selects a color point close to the edge of the chromaticity diagram 16, it may be assumed that the user would like wavelengths close to the selected color point to be heavily included, with other wavelengths being less desired. Therefore, the extent to which the desired color point is achieved utilizing a mix of most or all of available wavelengths, or with a smaller number of wavelengths from channels associated with points on the chromaticity diagram close to the selected color point, may be determined in proportion to their relative distance of the selected color point to the center, or to the edge, of the chromaticity diagram 16.

Figure 6:
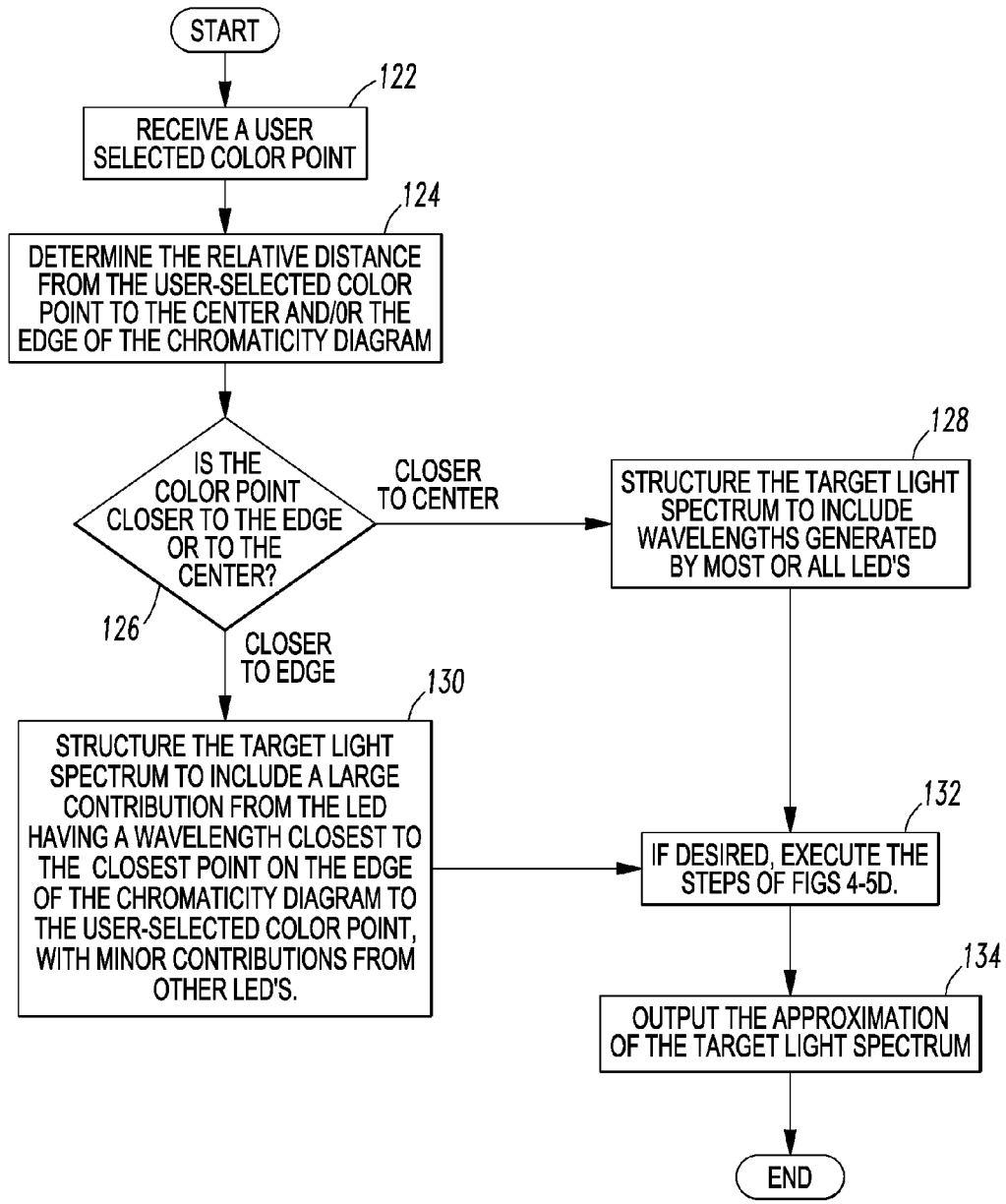
FIG. 6 depicts a flowchart showing the overall steps for generating an approximation of a user-selected target light spectrum.

The basic procedure is illustrated in FIG. 6. The user-selected color point is received at step 122. The relative distance of the color point to a central region of the chromaticity diagram, and/or to the edge of the diagram, is determined at steps 124 and 126. If the color point is closer to the center of the chromaticity diagram, then the target light spectrum will be assumed to include as many wavelengths as possible given those available within the luminaire, at step 128. Conversely, if the color point is relatively close to the edge of the chromaticity diagram, then the target light spectrum will be assumed to include a heavy component of primary spectra having color points which are close to the selected color point, with smaller contributions from other primary spectra, at step 130. With the target light spectrum thereby determined, the procedure of FIGS. 4-5C can then be followed at step 132, and the approximation of the target spectrum can be output at step 134.

The optimization method described herein may in some examples of the luminaire 10 be performed within the fixture controller 14. For other examples of the luminaire 10, at least a portion of the optimization method may be performed on a separate computer system, with the resulting light source driving conditions being communicated to the fixture controller 14.

A method of optimizing the various components of an approximation of a target light spectrum that is output by a light replicating luminaire is therefore provided. The user of the luminaire may assign weights to various criteria, and the approximation is optimized based on the weights assigned to these criteria. Furthermore, a method of permitting a user to enter a target light spectrum by specifying a three-dimensional color point on a chromaticity diagram is provided.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A method of replication of light by a luminaire, the luminaire comprising a plurality of light sources, the method comprising:

providing a target light spectrum to the luminaire;
defining a replication objective by assigning a weight to matching at least one characteristic of the target light spectrum;
determining driving conditions for each light source to provide an approximated light that meets the replication objective, with the driving conditions being determined utilizing the weight assigned to at least one characteristic of the target light spectrum; and
driving each wavelength channel at the driving conditions.

2. The method according to claim 1, wherein the characteristics include at least one of spectral shape, color, or radiant flux.

3. The method according to claim 1, wherein the target light spectrum is provided in the form of a plurality of numbers, said plurality of numbers representing the driving conditions for the wavelength channels of the luminaire or a reference luminaire.

4. The method according to claim 1, wherein the replication objective includes minimizing a difference of spectral shapes between the target light spectrum and the approximation.

5. The method according to claim 1, wherein the replication objective includes minimizing a difference between color points of the target light spectrum and the approximation.

6. The method according to claim 1, wherein the replication objective includes minimizing a difference between radiant fluxes of the target light spectrum and the approximation.

7. The method according to claim 1, wherein the replication objective includes minimizing a difference between luminous fluxes of the target light spectrum and the approximation.

8. The method according to claim 1, wherein the replication objective includes maximization of a color rendering characteristic of the approximated light.

9. The method according to claim 1, wherein achieving the replication objective comprises minimization of a function of differences in characteristics between the target light spectrum and approximated light, the differences being weighted according to the relative importance of the characteristics.

10. The method according to claim 9:
wherein the function of differences between the target light spectrum and approximated light includes the driving conditions of the wavelength channels as at least one independent variable; and
further comprising utilizing an iterative minimization process to adjust the driving conditions of the wavelength channels until a predetermined level of optimization of the approximated light is achieved, or until other stopping criteria are met.

11. The method according to claim 10, wherein the function of differences is recalculated after a predetermined number of iterations.

12. The method according to claim 10, wherein:
the iterative minimization process includes constraining the driving conditions for each wavelength channel between zero and a predetermined maximum; and
after a predetermined number of iterations, those driving conditions that have been set at zero and those driving conditions that have been set at the predetermined maximum are treated as constants; and
minimizing the function of differences with respect to the remaining driving conditions to obtain a next set of driving conditions.

13. The method according to claim 12, wherein the next set of driving conditions is accepted if a lower value of the function of differences is achieved.

14. The method according to claim 1, wherein:
achieving the replication objective comprises iterative minimization of a function of a difference in a characteristic between the target light and the approximated light;
after a predetermined number of iterations, those driving conditions that have been set at zero and those driving conditions that have been set at the predetermined maximum are treated as constants; and
minimizing the function of a difference with respect to the remaining driving conditions to obtain a next set of driving conditions.

15. The method according to claim 14, wherein the next set of driving conditions is accepted if a lower value of the function of a difference is achieved.

16. The method according to claim 1, wherein determining driving conditions for each wavelength channel utilizes an iterative process.

17. The method according to claim 1, wherein achieving the replication objective comprises iterative minimization of a function of a difference in a characteristic between the target light and the approximated light, and wherein said function is recalculated after a predetermined number of iterations.

18. The method according to claim 1, wherein:
the step of determining the driving conditions utilizes an iterative process, the results of the iterative process being constrained to a minimum of zero and a predetermined maximum;
after a predetermined number of iterations, those driving conditions that have values of either zero or at the predetermined maximum are treated as constants in a next one or more steps of the iterative process.

19. The method according to claim 1, wherein the driving conditions for each light source are specified by specifying at least one of an amplitude modulation level or a pulse width modulation duty cycle.

20. The method according to claim 19, wherein:
the driving conditions are specified by both an amplitude modulation level and a pulse width modulation duty cycle; and
the amplitude modulation level and the pulse width modulation duty cycle are specified to maximize the efficiency of the luminaire.

21. The method according to claim 19, wherein:
the amplitude modulation level is set to a lowest available value to produce a level of luminous flux above a desired luminous flux output of the approximation; and
the pulse width modulation duty cycle is selected to provide the desired luminous flux output of the approximation given the selected amplitude modulation level.

22. The method according to claim 1, wherein at least one characteristic of the target light spectrum is provided by a user of the luminaire.

23. The method according to claim 22, wherein the at least one characteristic of the target light spectrum is a color point to be simulated by the target light spectrum.

24. The method according to claim 23, wherein the color point is specified by providing three variable parameters, the three variable parameters defining a point within a three dimensional color space.

25. The method according to claim 24, wherein the three variable parameters are selected from the group consisting of:
a color point in a 2-dimensional color space and a flux of output light;

a correlated color temperature and the distance from a black body curve; and a color point in a 3-dimensional color space.

26. The method according to claim 21, further comprising;

forming a target light spectrum from the target light characteristic; and selecting light sources to include within the target light spectrum based on the proximity of the color point to a central region of the color space or the proximity of the color point to an edge of the color space.

* * * * *